(12) United States Patent
Veldhoen et al.

(10) Patent No.: US 11,607,854 B2
(45) Date of Patent: Mar. 21, 2023

(54) GUIDING DEVICE

(71) Applicant: VMI HOLLAND B.V., Epe (NL)

(72) Inventors: Cornelis Veldhoen, Epe (NL); Henrick Theodoor Posthumus, Epe (NL)

(73) Assignee: VMI HOLLAND B.V.

( * ) Notice: Subject to any disclaimer, the term of this patent is extended or adjusted under 35 U.S.C. 154(b) by 44 days.

(21) Appl. No.: 17/601,360

(22) PCT Filed: Mar. 23, 2020

(86) PCT No.: PCT/NL2020/050193
§ 371 (c)(1),
(2) Date: Oct. 4, 2021

(87) PCT Pub. No.: WO2020/204701
PCT Pub. Date: Oct. 8, 2020

(65) Prior Publication Data
US 2022/0176662 A1     Jun. 9, 2022

(30) Foreign Application Priority Data

Apr. 4, 2019   (NL) .................................... 2022861

(51) Int. Cl.
*B29D 30/00* (2006.01)
*B29D 30/16* (2006.01)
(Continued)

(52) U.S. Cl.
CPC ..... *B29D 30/0016* (2013.01); *B29D 30/1635* (2013.01); *B65G 39/04* (2013.01);
(Continued)

(58) Field of Classification Search
CPC ............ B29D 30/0016; B29D 30/1635; B29D 2030/0038; B29D 2030/1664;
(Continued)

(56) References Cited

U.S. PATENT DOCUMENTS 3,064,796 A * 11/1962 Orwin .................... B65G 39/04
198/842
3,118,532 A * 1/1964 Osgood .................. B65G 39/04
198/824
(Continued)

FOREIGN PATENT DOCUMENTS

CN      201729509      2/2011      ............. B65G 49/06
CS        233 667      3/1985      ............. B56G 39/04
(Continued)

OTHER PUBLICATIONS

International Search Report and Written Opinion issued in PCT/NL2020/050193, dated May 29, 2020, 10 pages.
(Continued)

*Primary Examiner* — Mark A Deuble
(74) *Attorney, Agent, or Firm* — Hayes Soloway P.C.

(57) ABSTRACT

Disclosed is a guiding device having a guide roller that is rotatable about a roller axis and that has an exterior guide surface extending in a circumferential direction about the roller axis, wherein the guide roller includes a plurality of roller segments juxtaposed in an axial direction along the roller axis for forming the exterior guide surface, wherein the plurality of roller segments are movable relative to each other to enable the guide roller to be positioned in a maximum bend state in which the roller axis extends along an arc, wherein the plurality of roller segments are interlocked to rotate together about the roller axis in a maximum bend state, wherein the plurality of roller segments extend over an arc length along the arc of the roller axis, wherein the arc length is at least ninety degrees in the maximum bend state.

23 Claims, 9 Drawing Sheets

(51) Int. Cl.
  *B65G 39/04* (2006.01)
  *B65H 27/00* (2006.01)

(52) U.S. Cl.
  CPC ..... *B65H 27/00* (2013.01); *B29D 2030/0038* (2013.01); *B29D 2030/1664* (2013.01); *B65H 2404/111* (2013.01); *B65H 2404/133* (2013.01); *B65H 2404/1313* (2013.01); *B65H 2404/1321* (2013.01)

(58) Field of Classification Search
  CPC ...... B65G 39/04; B65G 39/125; B65G 39/14; B65G 39/145; B65G 39/16; B65G 15/08; B65H 27/00; B65H 2404/111; B65H 2404/133; B65H 2404/1321; B65H 2404/13211; B29C 31/008; B29C 31/08
  See application file for complete search history.

(56) References Cited

U.S. PATENT DOCUMENTS

| | | | | |
|---|---|---|---|---|
| 3,166,184 A * | 1/1965 | Boyd | ...................... | B65G 39/04 198/824 |
| 3,550,758 A * | 12/1970 | Stalker | ................... | B65G 39/04 193/37 |
| 4,144,964 A | 3/1979 | Valcalda | ....................... | 198/830 |
| 4,196,805 A * | 4/1980 | Banno | .................... | B65G 43/00 492/16 |
| 4,720,007 A * | 1/1988 | Milek | .................... | B65G 39/04 198/830 |
| 4,787,504 A | 11/1988 | Schultz | ......................... | 198/782 |
| 5,316,130 A | 5/1994 | Heit et al. | .................... | 198/781 |
| 5,975,179 A | 11/1999 | Kelly, Jr. | ...................... | 156/421 |
| 2004/0007024 A1 | 1/2004 | Andou et al. | ................... | 65/370 |
| 2006/0185964 A1 | 8/2006 | Olsson et al. | ................ | 198/778 |
| 2015/0053535 A1 | 2/2015 | Silva | ............................. | 198/826 |
| 2020/0172342 A1* | 6/2020 | Graham | ................. | B65G 39/14 |

FOREIGN PATENT DOCUMENTS

| | | | | |
|---|---|---|---|---|
| DE | 655 270 | 1/1938 | | |
| DE | 1 142 787 | 1/1963 | ............. | B65G 39/04 |
| DE | 2 024 607 | 12/1970 | ............... | B29H 9/04 |
| DE | 27 52 410 | 5/1979 | ............. | B65G 15/34 |
| DE | 10 2015 207 740 | 11/2016 | ............. | B29D 30/26 |
| JP | S52-56881 | 4/1977 | ............. | B65G 39/04 |
| JP | 2003-321231 | 11/2003 | ........... | C03B 23/025 |
| KR | 1020050083927 | 8/2005 | ............. | B65G 21/02 |
| WO | WO 2014/039078 | 3/2014 | ............... | E21B 7/08 |
| WO | WO 2015/151435 | 10/2015 | ............. | B29D 30/30 |

OTHER PUBLICATIONS

International Preliminary Report on Patentability issued in PCT/NL2020/050193, dated Sep. 17, 2020, 16 pages.
Netherlands Search Report issued in Netherlands Patent Appln. Serial No. NL 2022861, dated Apr. 4, 2019, 9 pages.
Office Action issued in Japanese Patent Appln. Serial No. 2020-560986, dated Oct. 5, 2021, with machine translation, 8 pages.
Decision issued in Japanese Patent Appln. Serial No. 2020-560986, dated Aug. 2, 2022, with machine translation, 5 pages.
Notice of Allowance issued in Korean Patent Appln. Serial No. 10-2021-7035965, dated Nov. 4, 2022, with machine English translation, 14 pages.

* cited by examiner

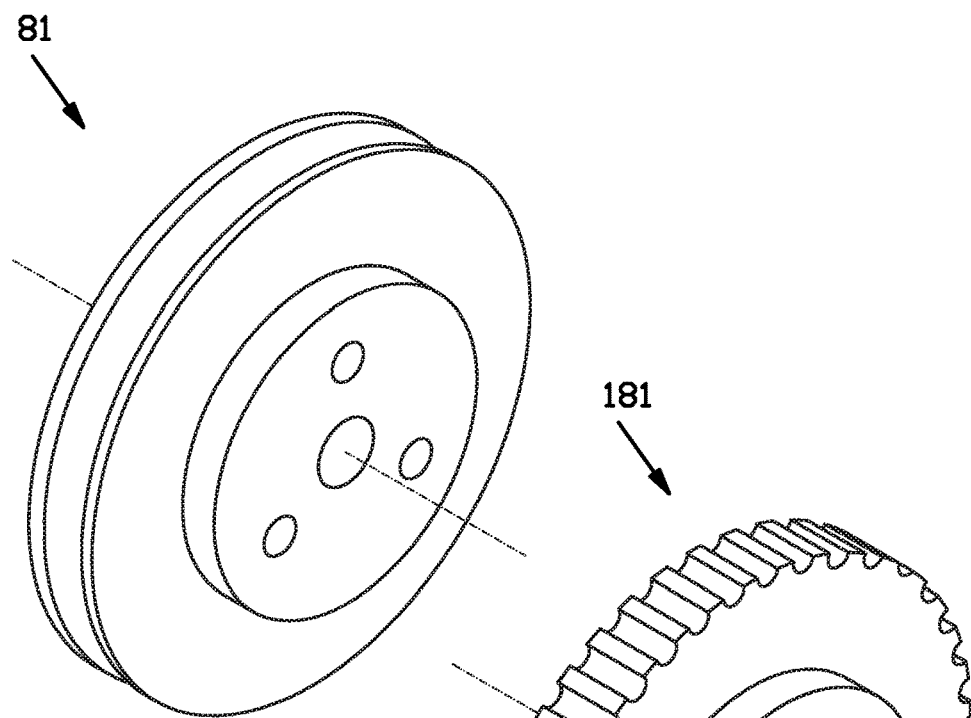
FIG. 6
FIG. 7
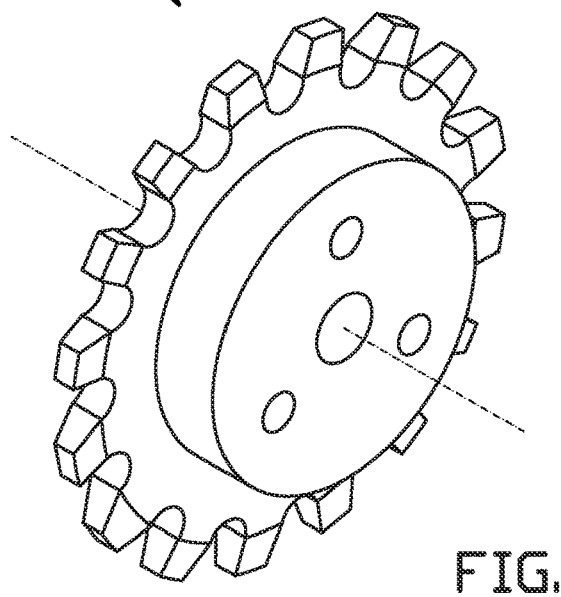
FIG. 8

GUIDING DEVICE

BACKGROUND

The invention relates to a guiding device, in particular a guiding device for guiding a strip used in tire building. More in particular, the strip may be formed by pulling a slab of raw elastomeric material apart along a zig-zag cutting pattern. Such a flexible strip may change abruptly in shape, size and/or direction along the length thereof. Alternatively, the guiding device may be used to guide rigid articles, such as tubes or rods. The guiding device may also be used as a part of a conveyor.

It is known to use a guiding device for guiding flexible strips of raw material from a source to a destination. Each flexible strip may vary considerably in shape, size and/or direction along the length of the flexible strip. Also, the flexible strips may arrive at the guiding device at widely varying supply angles and may need to be deflected considerably towards the destination. The known guiding device typically comprises a main guide roller for guiding the flexible strips from the source towards the destination and side guide rollers placed at an angle to the main guide roller at either end of the main guide roller to keep the flexible strips on the main guide roller. An example of such a known guide roller assembly is shown in FIG. 14.

SUMMARY OF THE INVENTION

A disadvantage of the known guiding device is that the flexible strips may get stuck or pinched in the corners between the main guide roller and the side guide rollers. Moreover, the flexible strips will experience increased friction when contacting both the main guide roller and one of the side guide rollers. The contact with the side guide roller may also cause deformations in the flexible strip material.

It is an object of the present invention to provide a guiding device, wherein at least one of the aforementioned disadvantages can be reduced.

According to a first aspect, the invention provides a guiding device comprising a guide roller that is rotatable about a roller axis and that has an exterior guide surface extending in a circumferential direction about the roller axis, wherein the guide roller comprises a plurality of roller segments juxtaposed in an axial direction along the roller axis for forming the exterior guide surface, wherein the plurality of roller segments are movable relative to each other to enable the guide roller to be positioned in a first bend state in which the roller axis extends along an arc, wherein the plurality of roller segments are interlocked to rotate together about the roller axis in said first bend state, wherein the plurality of roller segments extend over an arc length along the arc of the roller axis, wherein said arc length is at least ninety degrees in the first bend state.

In the first bend state, the guide roller can reliably guide or deflect a strip originating from a wide range of source directions into a chosen destination direction. With a greater arc length, the strip can be guided over the guide roller from a wider range of source directions. In particular, for many source directions, there is guide path over the guide roller that is tangent to exterior guide surface. Moreover, the use of single guide roller in a first bend state eliminates the risk of the strip being pinched in a corner between two rollers, as in the prior art. When the roller axis extends along an arc, as part of a circle, the guide roller can be bend with a constant radius, i.e. smooth without abrupt changes in its direction. Finally, by providing a guiding device with co-rotating, interlocked roller segments, rotational speed differences between the roller segments can be cancelled out and friction between strip and the guide roller as a result of said rotation speed differences can be reduced. In fact, the roller segments can rotate in unison as if the guide roller was an integral roller.

In a preferred embodiment the roller segments have an outer diameter, wherein the roller axis in the first bend state extends along an arc with an arc radius, wherein the ratio between the arc radius and the outer diameter is less than five. More preferably, the ratio is in a range between two-and-a-half and five. The relatively large outer diameter of the roller segments reduces the risk of irregular strips getting stuck between said roller segments. This is particularly relevant for strips that are cut according to a zig-zag pattern and that may have abrupt changes in direction. The relatively large outer diameter of the roller segments may further contribute to the release of the tacky rubber material of the strip from the roller segments as the strip passes through and leaves the guiding device.

In another embodiment the first bend state is a maximum bend state, preferably wherein the guide roller is flexible into the maximum bend state. The maximum bend state is the state in which the guide roller can not be flexed or bent any further.

Preferably, the guide roller is flexible between a first bend state and a second bend state different from the first bend state, wherein the plurality of roller segments are interlocked to rotate together about the roller axis in a range from the first bend state up to the second bend state. Hence, the diameter, radius and/or curvature of the roller axis can be adjusted while maintaining the interlock between the roller segments.

In another embodiment each pair of two consecutive roller segments of the plurality of roller segments is mutually pivotable about a pivot axis perpendicular to the roller axis over a maximum pivot angle of at least three degrees. Preferably, the maximum pivot angle is at least five degrees. The maximum pivot angle determines the amount of arc length that each pair of two consecutive roller segments can contribute to the overall arc length of the guide roller. Hence, when twelve segments forming eleven pairs have a maximum pivot angle of ten degrees, then an arc length of one-hundred-and-ten degrees can be obtained.

In another embodiment the plurality of roller segments comprises at least ten roller segments. With more roller segments, a greater arc length can be obtained, or the maximum pivot angle per pair of roller segments can be reduced.

In another embodiment the guide roller in the first bend state extends along an arc that defines a center, wherein the guide roller has an inner radius with respect to said center, wherein for each pair of two consecutive roller segments of the plurality of roller segments, the two consecutive roller segments are mutually pivotable about a pivot axis perpendicular to the roller axis, wherein said pivot axis is located between the roller axis and the inner radius. Consequently, the roller segments can be kept as close as possible to each other at the inner radius where the strip runs over the exterior guide surface. More in particular, when the pivot axis is located close to the inner radius, gaps in the exterior guide surface as a result of the pivoting of the roller segments can be minimized.

In another embodiment, for each pair of two consecutive roller segments, one roller segment of the two consecutive roller segments comprises a plurality of first teeth and the other roller segment of the two consecutive roller segments comprises a plurality of second teeth, wherein the plurality of first teeth and the plurality of second teeth are arranged to interlock. The interlocking teeth can transfer the rotation from one roller segment to the next while the shape of the interlocking teeth can be optimized to minimize the gaps in the exterior guide surface. In particular, the roller segments may be arranged to pivot about a pivot axis close to the inner radius of the guide roller so that the teeth close to said inner radius remain fully interlocked while the teeth further or furthest away from the inner radius may move at least partially out of interlocking engagement.

In a preferred embodiment thereof, the first bend state is a maximum bend state in which the guide roller has an inner radius and an outer radius with respect to the center of the arc, wherein the plurality of first teeth and the plurality of second teeth are arranged to interlock at both the inner radius and the outer radius when the guide roller is in the maximum bend state. Consequently, it can be prevented around the entire circumference of the guide roller that the material of the strip is pinched and/or gets stuck between the roller segments. Moreover, the teeth can remain reliably interlocked for rotation at both the inner and the outer radius, even when the guide roller is flexed to its maximum bend state.

In a further embodiment, each roller segment comprises a segment body that is rotatable about a segment axis in a rotation plane perpendicular to said segment axis and a plurality of first teeth which is distributed in a circumferential direction about the segment axis and projects in an interlock direction from the segment body at a first side of the rotation plane. The plurality of first teeth can effectively engage and/or interlock with the teeth of a directly adjacent one of the roller segments in the interlock direction.

Preferably, the interlock direction is parallel to the segment axis. In this embodiment, the first teeth project from the segment body in a direction parallel to the segment axis, i.e. towards the directly adjacent roller segment in the axial direction of the guide roller.

In a further embodiment thereof each roller segment is further provided with a plurality of second teeth distributed in a circumferential direction about the segment axis and projecting in the interlock direction from the segment body at a second side of the rotation plane opposite to the first side. Hence, each roller segment can interlock with directly adjacent roller segments on either side thereof in the axial direction.

Preferably, each first tooth of the plurality of first teeth has a tooth profile, wherein each second tooth of the plurality of second teeth has the same or substantially the same tooth profile. Hence, the first teeth and the second teeth can be complementary in shape.

Preferably, each second tooth of the plurality of second teeth has a tooth profile, wherein each pair of two consecutive first teeth of the plurality of first teeth define a valley, wherein the valley has a valley profile that is complementary or substantially complementary to the tooth profile of the plurality of second teeth. Hence, the valley can be optimized to tightly receive the second tooth and minimize the gap between the first teeth and the second tooth therein between.

In a further embodiment each first tooth of the plurality of first teeth has a crest that defines a top land, wherein said top land extends at an oblique angle to the rotation plane in a range of three to fifteen degrees. The oblique angle of the top land allows for the crest to be nested tightly into the valley between the teeth of a directly adjacent one of the roller segments. In particular, the oblique angle can be chosen such that the top land is parallel to the bottom land of an opposing valley when the roller segments are at the aforementioned maximum pivot angle, i.e. when the bottom land and the top land are in abutment. Hence, the exterior guide surface at the transition from one roller segment to the next can be substantially continuous, congruent or without gaps at the inner radius when said roller segments are at their maximum pivot angle.

In a further embodiment each first tooth of the plurality of first teeth has a root, wherein the segment body defines a bottom land between the roots of each pair of two consecutive first teeth of the plurality of first teeth, wherein the bottom land extends at an oblique angle to the rotation plane in a range of three to fifteen degrees. The bottom land can thus be made to abut the crest and/or the top land of a tooth received therein at an oblique angle that is optimized to minimize the gap between said top land and the bottom land at the aforementioned inner radius of the guide roller. In particular, the top land and the bottom land can be in parallel abutment, i.e. without gaps.

In another embodiment the guiding device further comprises a shaft extending along the roller axis for supporting the plurality of roller segments. Alternatively, the roller segments may be self-supporting.

Preferably, each roller segment of the plurality of roller segments is provided with a central aperture for receiving the shaft concentrically in the respective roller segment.

Preferably, the shaft is resiliently flexible. Hence, the shaft enables the guide roller to be flexible, i.e. between the aforementioned straight state, the first bend state and/or the second bend state.

In a further embodiment each roller segment of the plurality of roller segments is movable over the shaft in the axial direction of the roller axis with respect to the other of the plurality of roller segments. The movement facilitates the pivoting of the roller segments relative to each other, in particular when said pivot axis is located at or near the inner radius of the guide roller.

In a further embodiment the guiding device further comprises a first stop member and a second stop member which are fixed in the axial direction of the roller axis on the shaft on opposite sides of the guide roller, wherein the guide roller is movable in the axial direction of the roller axis over the shaft between the first stop member and the second stop member. The stops may prevent that the roller segments move apart too far and/or out of interlocking engagement.

In another embodiment the guiding device further comprises a support for supporting the guide roller, wherein the support is arranged for supporting the guide roller such that the roller axis extends along a helical path. The guide roller may extend over a part of a winding, a full winding or a plurality of winding of the helical path, i.e. to guide the strip at least once per winding.

In another embodiment the guiding device comprises one or more biasing members for biasing the guide roller towards or away from the first bend state. The biasing members can keep the roller segments together while at the same time influence the behavior of the guide roller. The biasing members may for example aid to the stiffness of the guide roller.

In another embodiment the guide roller is provided with one or more channels extending through each of the plurality of roller segments along a respective biasing path to receive a respective biasing member.

Preferably, the one or more channels comprises at least three channels spaced apart from and evenly distributed about the roller axis. Hence, the biasing force exerted by the biasing members on the guide roller can be evenly distributed around the guide roller.

According to a second aspect, the invention provides a guiding device comprising a guide roller that is rotatable about a roller axis and that has an exterior guide surface extending in a circumferential direction about the roller axis, wherein the guide roller comprises a plurality of roller segments juxtaposed in an axial direction along the roller axis for forming the exterior guide surface, wherein the plurality of roller segments are movable relative to each other to enable the guide roller to be positioned in a first bend state in which the roller axis extends along an arc, wherein the plurality of roller segments are interlocked to rotate together about the roller axis in said first bend state, wherein the roller segments have an outer diameter, wherein the roller axis in the first bend state extends along an arc with an arc radius, wherein the ratio between the arc radius and the outer diameter is less than five. More preferably, the ratio is in a range between two-and-a-half and five. The relatively large outer diameter of the roller segments reduces the risk of irregular strips getting stuck between said roller segments. This is particularly relevant for strips that are cut according to a zig-zag pattern and that may have abrupt changes in direction. The relatively large outer diameter of the roller segments may further contribute to the release of the tacky rubber material of the strip from the roller segments as the strip passes through and leaves the guiding device.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIGS. 6, 7 and 8 show different drive wheels for connection to the roller segments according to FIG. 1;

DETAILED DESCRIPTION OF THE INVENTION

FIGS. 1, 2, 9, 10, 11 and 13 show a guiding device 1 according to an exemplary first embodiment of the invention.

Figure 13:
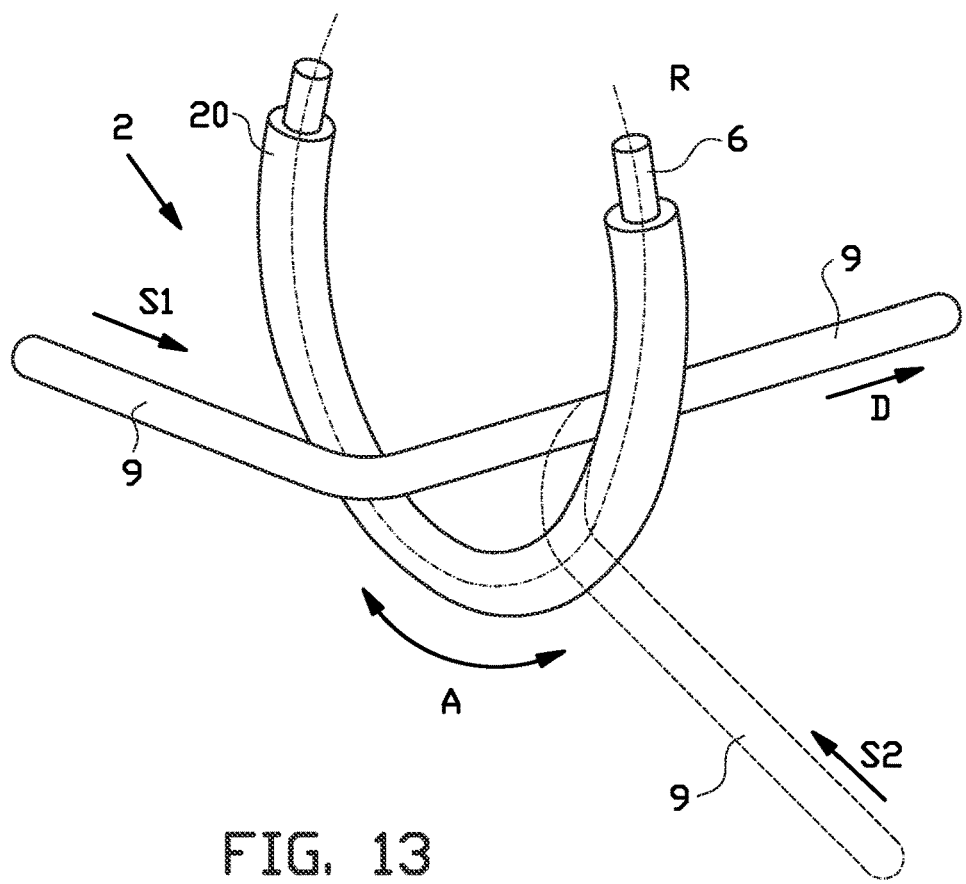
FIG. 13 shows a first strip and a second strip being guided along two different paths from a source to a destination over the guiding device according to FIG. 1.
Figure 14:
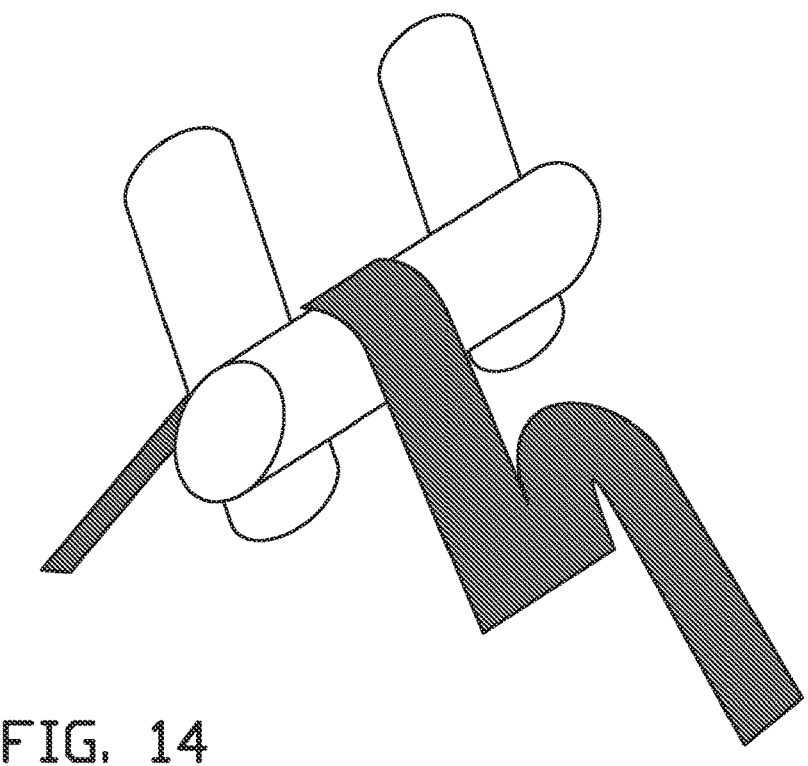
FIG. 14 shows a known guiding device according to the prior art.

As shown in FIG. 13, the guiding device 1 is used for guiding a strip 9 from a source along a source direction S1, S2 to a destination along a destination direction D. In this example, the strip 9 is a rubber or elastomeric flexible strip used in tire building. More in particular, the strip 9 may be a formed by pulling a slab of raw elastomeric material apart along a zig-zag cutting pattern. Such a strip 9 may change abruptly in shape, size and/or direction along the length thereof. Moreover, the source direction S1, S2 may vary considerably from the destination direction D, i.e. over more than ninety degrees or more than one-hundred-and-twenty degrees. The guiding device 1 according to the present invention is capable of reliably and/or effectively deflecting the strip 9 from the source to the destination regardless of the abrupt changes in shape, size or direction in a manner described hereafter in more detail.

Figure 1:
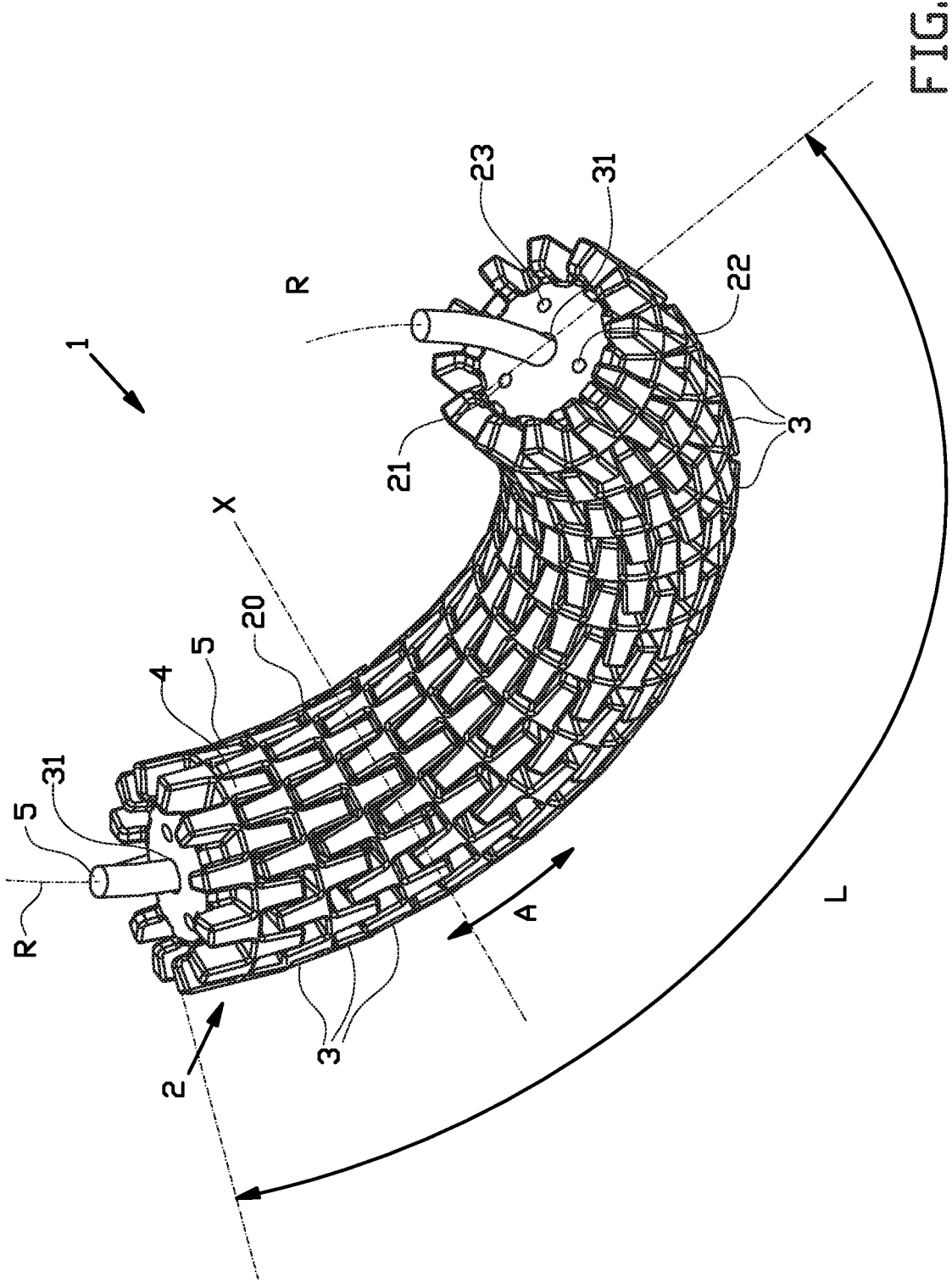
FIG. 1 shows an isometric view of a guiding device with a plurality of roller segments according to a first embodiment of the invention.
Figure 2:
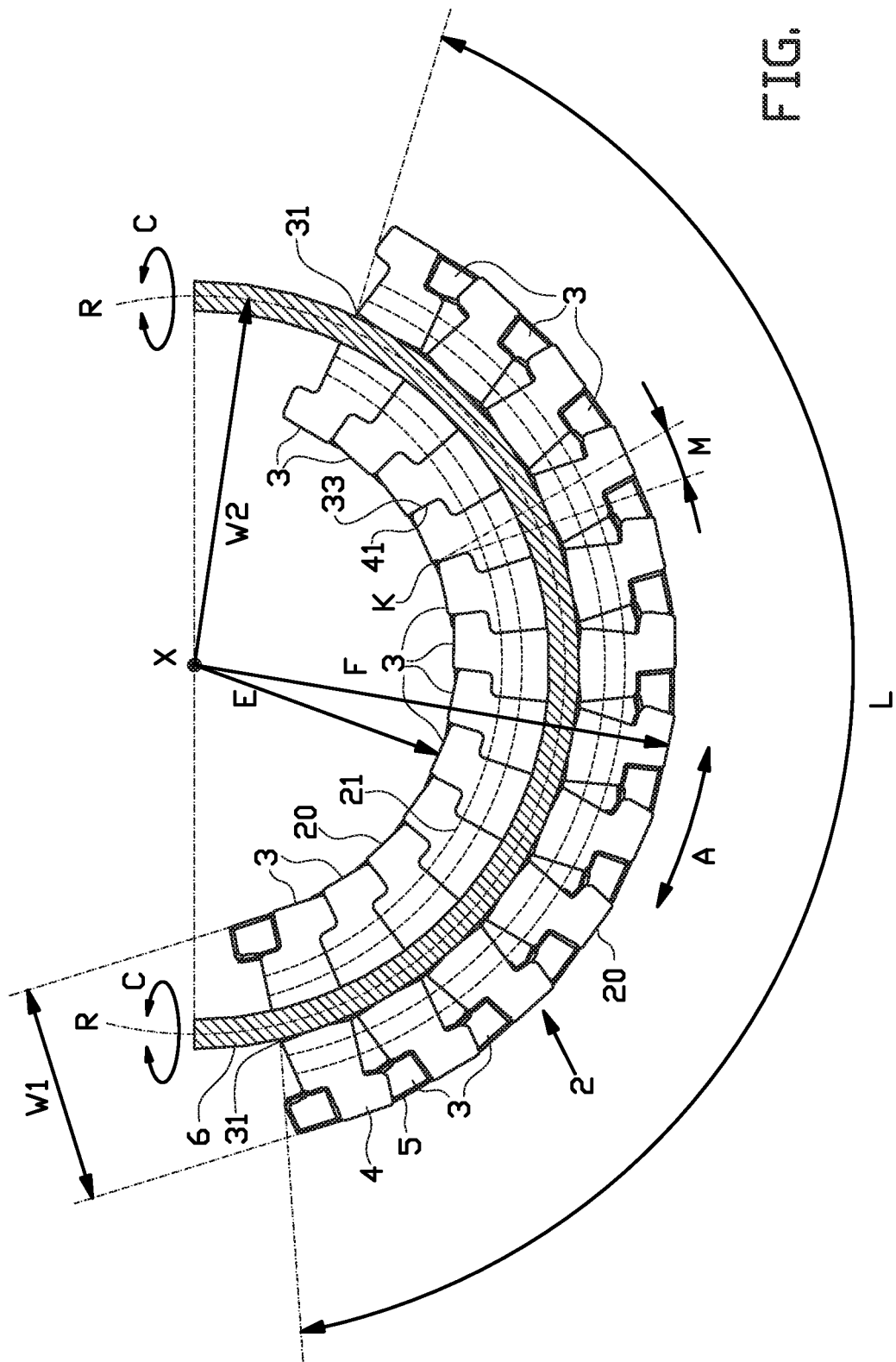
FIG. 2 shows a cross section of the guiding device according to line II-II in FIG. 1.

As shown in FIGS. 1 and 2, the guiding device 1 comprises a guide roller 2 that is rotatable about a roller axis R. The guide roller 2 comprises an exterior guide surface 20 extending in a circumferential direction C about the roller axis R. The guide roller 2 comprises a plurality of roller segments 3 juxtaposed in an axial direction A along the roller axis R. In this example, the guide roller 2 comprises twelve roller segments 3. The roller segments 3 have an outer diameter W1. Together, the plurality of roller segments 3 form the exterior guide surface 20 of the guide roller 2. The plurality of roller segments 3 are interlocked to rotate together about the roller axis R. 'Interlocked' in the context of the present invention is to be interpreted as the act of engaging the roller segments 3 with each other by overlapping or fitting them together so that they are linked. In other words, the roller segments 3 are interlocked such that the rotation of one roller segment 3 automatically brings about the operation of another one of the interlocked roller segments 3.

The plurality of roller segments 3 are movable, rotatable and/or pivotable relative to each other to enable the guide roller 2 to be positioned in a first bend state in which the roller axis R is non-linear, as shown in FIGS. 1 and 2. The roller axis R may for example extend along an arc with a center X, as shown in FIGS. 1 and 2, or along a series of arcs. In said first bend state, the roller segments 3 remain interlocked to rotate together about the roller axis R.

In this exemplary embodiment, the guiding device 1 further comprises a shaft 6 for supporting the plurality of roller segments 3 along the roller axis R. Preferably, the shaft 6 is resiliently flexible to assume the bend or flexed orientation as shown in FIGS. 1 and 2. Alternatively, the shaft 6 may be rigid for supporting the plurality of roller segments 3 only in the bend or flexed orientation as shown. The shaft 6 may be optional, provided that the roller segments 3 are self-supporting along the roller axis R, i.e. via mutual supports (not shown).

Figure 3:
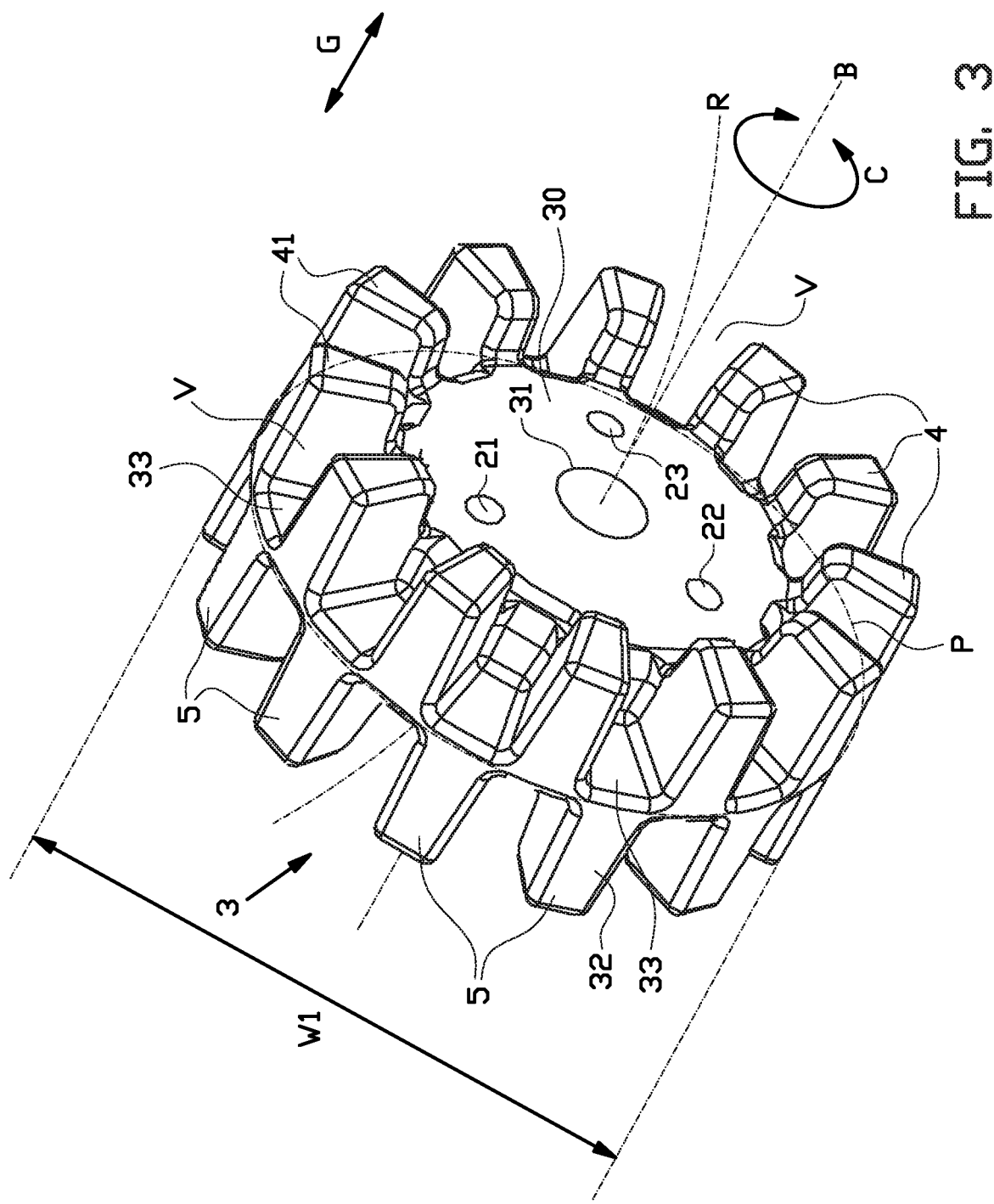
FIG. 3 shows an isometric view of one of the roller segments according to FIG. 1 in isolation.
Figure 4:
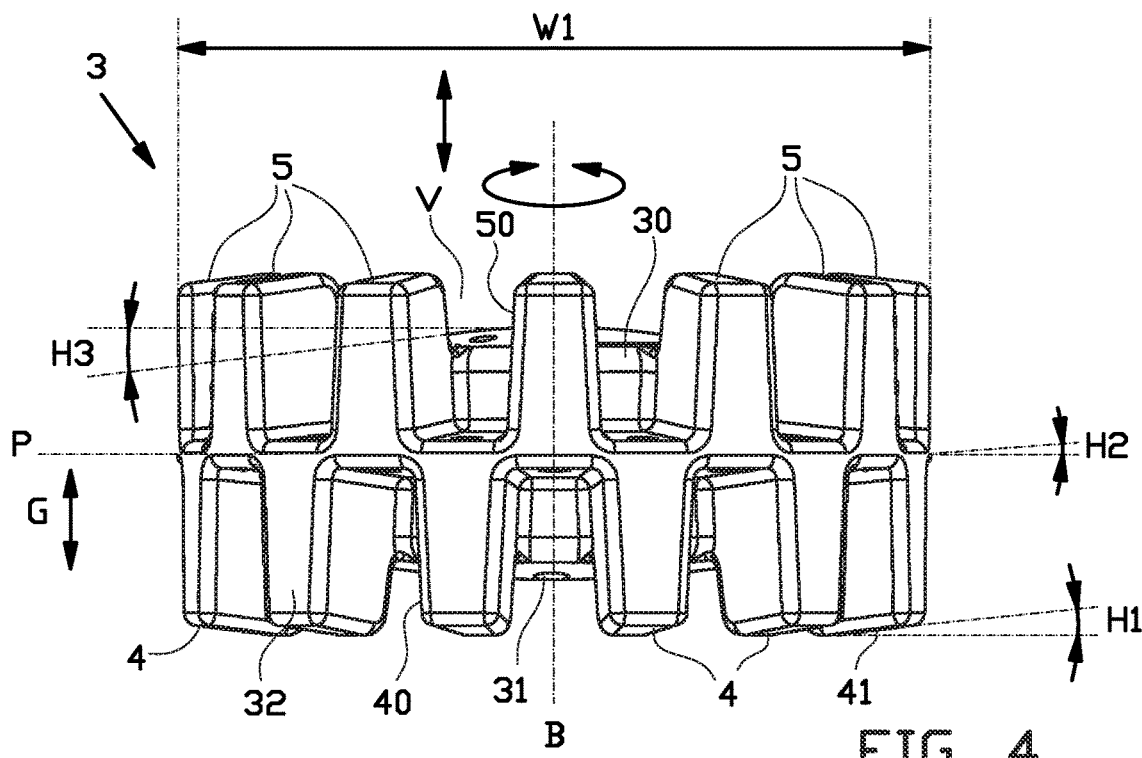
FIG. 4 shows a front view of said one roller segment of FIG. 3.
Figure 5:
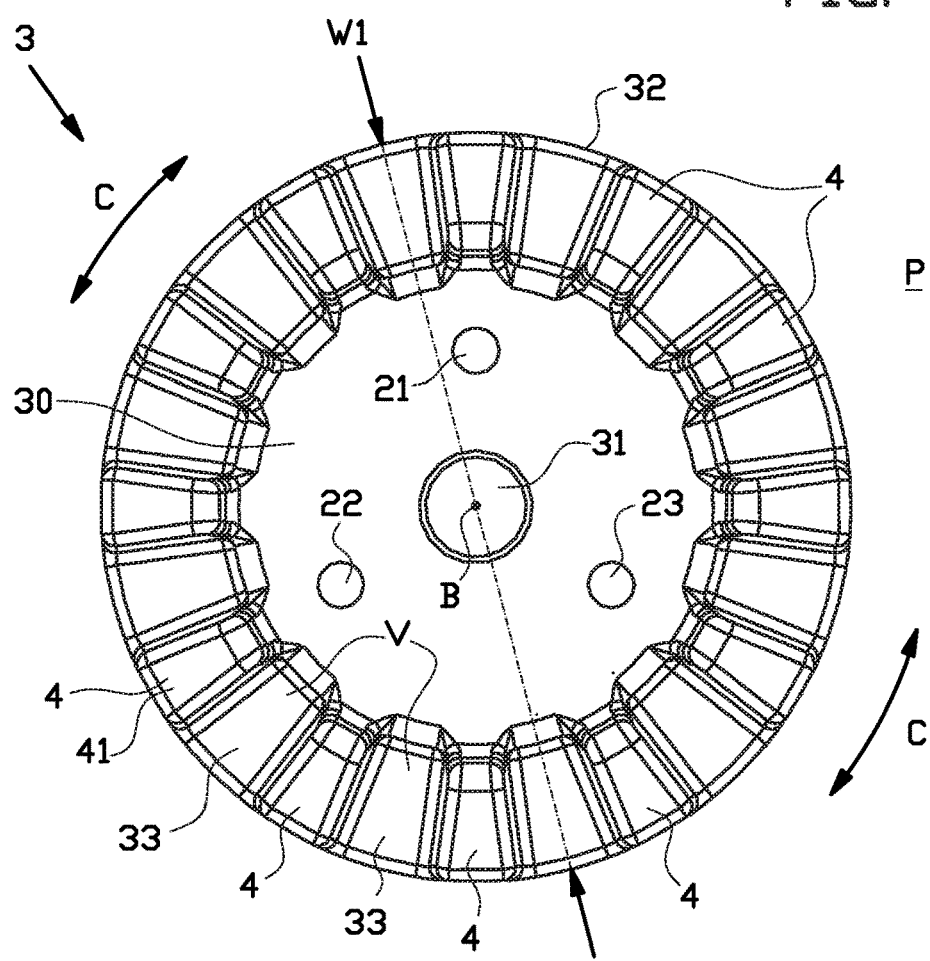
FIG. 5 shows a side view of said one roller segment of FIG. 3.

As best seen in FIGS. 3, 4 and 5, each roller segment 3 of the plurality of roller segments 3 comprises a segment body 30 that is rotatable about a segment axis B in a rotation plane P perpendicular to said segment axis B. As shown in FIG. 3, the segment axis B is tangent or substantially tangent to the roller axis R at the position of the respective roller segment 3. Hence, the circumferential direction C about the roller axis R corresponds or substantially corresponds to the circumferential direction C about the segment axis B at the position of the respective roller segment 3.

When the guiding device 1 is provided with the aforementioned shaft 6, then each roller segment 3 further comprises a central aperture 31 for receiving said shaft 6, as shown in FIGS. 1 and 2. The central aperture 31 is located concentrically in or at the heart of the respective roller segment 3, i.e. at the segment axis B. The roller segments 3 are not fixed in a particular axial position on the shaft 6. Thus, when given the space, each roller segment 3 of the plurality of roller segments 3 is (slightly) movable over the shaft 6 in the axial direction A of the roller axis R with respect to the other of the plurality of roller segments 3. This may provide the roller segments 3 some clearance to facilitate the movement into the first bend state of the guide roller 2 as shown in FIGS. 1 and 2. The roller segments 3 are also not fixed to the shaft 6 in the circumferential direction C. The roller segments 3 are thus freely rotatable in the circumferential direction C about the shaft 6.

Figure 11:
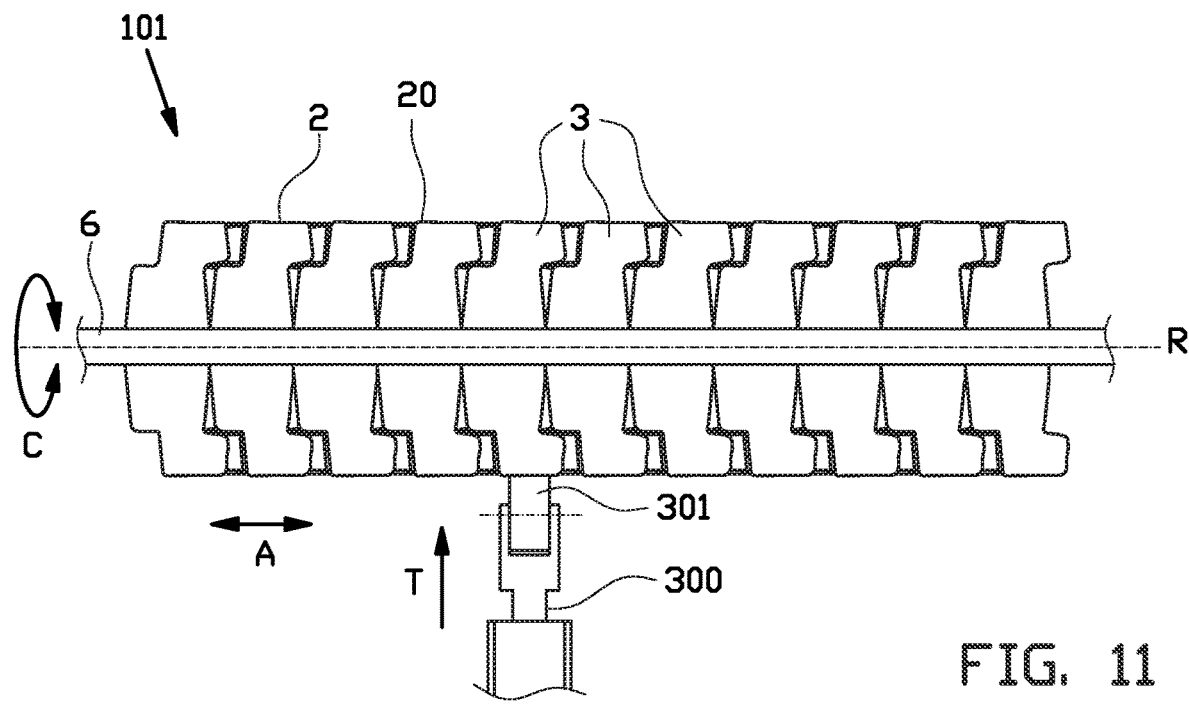
FIG. 11 shows the guiding device of FIG. 1 in a straight state.

Optionally, the guide roller 2 is provided with one or more channels 21, 22, 23 extending through each of the plurality of roller segments 3 along a respective biasing path to receive a respective biasing member (not shown). Such a biasing member may for example be a spring that is biased to contract. Hence, the biasing member may bias the guide roller 2 to return from the first bend state into the second bend state or the straight state, as shown in FIG. 11. In this example, the one or more channels 21, 22, 23 comprises at least three channels 21, 22, 23 spaced apart from and evenly distributed about the roller axis R.

As best seen in FIG. 5, each roller segment 3 forms a surface section 32 extending in the circumferential direction C about the segment axis B. Together, the surface sections 32 of the plurality of roller segments 3 form the external guide surface 20 of the guide roller 2, as shown in FIGS. 1 and 2. Preferably, the surface section 32 is cylindrical or straight-cylindrical about the segment axis B. More preferably, the surface section 32 is continuous in the circumferential direction C about the segment axis B, at least at the mid-plane or the rotation plane P. In the example, the sides of the segment body 30 are conical, as best seen in FIG. 4, extending under a cone angle H3 to provide the roller segments 3 freedom to move when the guide roller 2 is flexed.

As shown in FIGS. 3, 4 and 5, each roller segment 3 comprises a plurality of first teeth 4 and a plurality of second teeth 5 which are distributed in the circumferential direction C about the segment axis B on opposite sides of the rotation plane P. The plurality of first teeth 4 projects in an interlock direction G from the segment body 30 at a first side of the rotation plane P. The plurality of second teeth 5 project in the interlock direction G from the segment body 30 at a second side of the rotation plane P opposite to the first side. In this example, the interlock direction G is parallel to the segment axis B and/or perpendicular to the rotation plane P. As shown in FIGS. 1 and 2, the roller segments 3 are located side-by-side in the axial direction A of the guide roller 2. Consequently, the plurality of first teeth 4 of one of the roller segments 3 is directly opposite to the plurality of second teeth 5 of a directly adjacent one of the roller segments 3.

Considering that the orientation of the teeth 4, 5 is perpendicular to the rotation plane P, each side of the roller segment 3 resembles a bevel gear wheel or a crown gear wheel. However, contrary to a bevel gear mechanism where the gear wheels are at right angles to each other, the roller segments 3 substantially coaxial on the roller axis R. Hence, all of the plurality of first teeth 4 of one of the roller segments 3 are arranged to interlock simultaneously with all of the plurality of second teeth 5 of the directly adjacent roller segment 3.

Note that the guide roller 2 may be provided with end roller segments (not shown) which are different from the roller segments 3 of the plurality of roller segments 3 in that do not have teeth of both side of the rotation plane P. As the end roller segments only interlock with the plurality of roller segments 3 at one side, the end roller segments can accordingly be formed with teeth on one side only. For the purpose of the invention, these alternative end roller segments do not form part of the 'plurality of roller segments' in the claims.

As best seen in FIG. 4, each first tooth 4 of the plurality of first teeth 4 has a tooth profile 40. Similarly, each second tooth 5 of the plurality of second teeth 5 has a tooth profile 50. Note that the tooth profiles 40, 50 of the first tooth 4 and the second tooth 5 are the same or substantially the same. Moreover, each pair of two consecutive first teeth 4 of the plurality of first teeth 4 define a valley V in the circumferential direction C between the respective pair of first teeth 4. Said valley V has a valley profile that is complementary or substantially complementary to the tooth profile 50 of the plurality of second teeth 5. Hence, the plurality of second teeth 5 are capable of being fitted tightly in the valleys V between the first teeth 4 of a directly adjacent one of the roller segments 3, thereby minimizing any gaps between the interlocked first teeth 4 and second teeth 5.

As shown in FIG. 2, each pair of two consecutive roller segments 3 is mutually pivotable about a pivot axis K perpendicular to the roller axis R over a maximum pivot angle M of at least three degrees, preferably at least five degrees. To further reduce gaps between the plurality of roller segments 3, in particular at the maximum pivot angle M, the roller segments 3 have been optimized for mutual abutment at said maximum pivot angle M, in particular at an inner radius E of the guide roller 2 with respect to the center X of the arc of the roller axis R. The inner radius E of the guide roller 2 in the first bend state extends at the side of the guide roller 2 where the radius and/or the diameter of the guide roller 2 is the smallest, i.e. where the side of the guide roller 2 that faces towards the center X of the arc defined by the roller axis R. The pivot axis K may be located at a position between the roller axis R and the inner radius E to ensure that the roller segments 3 tightly abut each other at the inner radius E.

The guide roller 2 further has an outer radius F with respect to the center X of the arc of the roller axis R, where the radius and/or diameter of the guide roller 2 is the largest, i.e. at the side of the guide roller 2 facing away from the center X of the arc defined by the roller axis R. As shown in FIG. 2, the teeth 4, 5 are arranged to be interlocked for rotation both at the inner diameter E and the outer diameter F, in particular when the guide roller 2 is in a maximum bend state, i.e. the state in which the guide roller 2 can not be flexed or bent any further. This maximum bend state may occur when the teeth 4, 5 are in mutual abutment at the inner radius E of the guide roller 2, as shown in FIG. 2. Hence, in this exemplary embodiment, the maximum bend state corresponds to the first bend state. The roller axis R in the first bend state extends along an arc with an arc radius W2 to the center X. The ratio between the arc radius W2 and the outer diameter W1 of the roller segments 3 is less than five. More preferably, the ratio is in a range between two-and-a-half and five. In other words, the arc radius W2 is two-and-a-half up to five times the outer diameter W1 of the roller segments 3.

As shown in FIG. 4, each first tooth 4 of the plurality of first teeth 4 has a crest that defines a top land 41. Each first tooth 4 further has a root 42. The segment body 30 forms a bottom land 33 between the roots 42 of each pair of two consecutive first teeth 5 of the plurality of first teeth 4. The top land 41 extends at an oblique angle H1 to the rotation plane P. Similarly, the bottom land 33 extends at an oblique angle to the rotation plane in a range of three to fifteen degrees. Preferably, the top land 41 and the bottom land 33 extend at the same oblique angle H1, H2 to the rotation plane P. Each second tooth 5 has a top land, a root and a bottom land defined between the respective roots with the same or substantially the same characteristics as the plurality of first teeth 4. Hence, it will be appreciated that when the top land 41 of one of the teeth 4, 5 is directly opposite to the bottom land 33 between the teeth 4, 5 of a directly adjacent one of the roller segments 3, as shown in FIG. 2, said top land 41 and bottom land 33 become parallel or substantially parallel when the respective roller segments 3 are at their maximum pivot angle M. Hence, the respective roller segments 3 can be in abutment at the concave or inner side of the guide roller 3, resulting in a substantially continuous or congruent concave or inner side.

Figure 12:
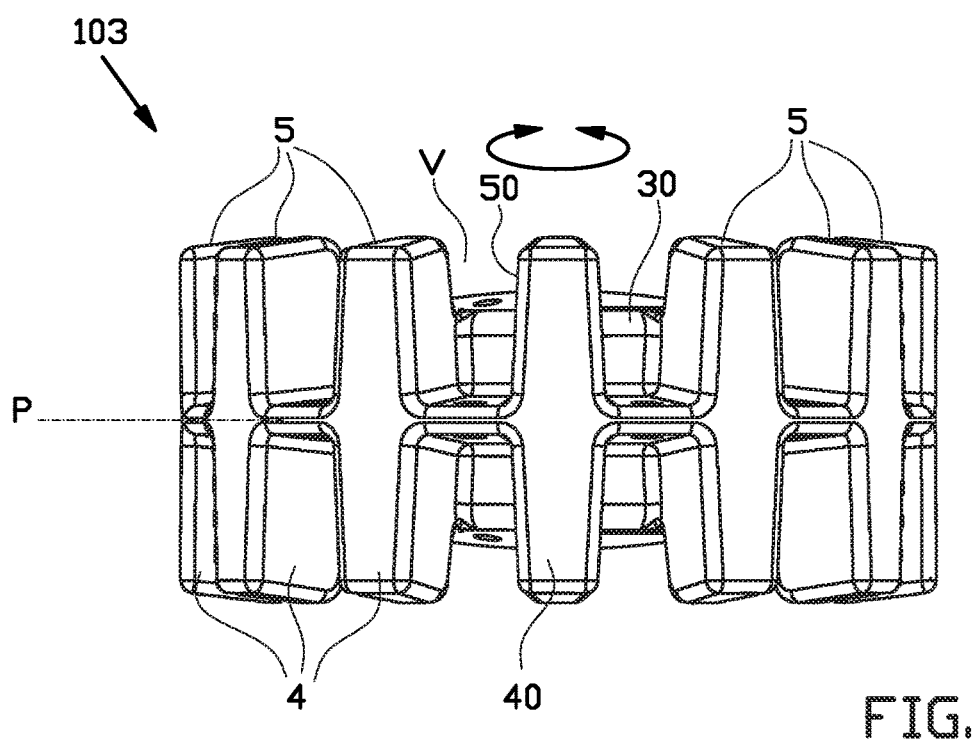
FIG. 12 shows a front view of an alternative roller segment according to a second embodiment of the invention.

It can be further observed in FIGS. 3, 4 and 5 that each roller segment 3 has substantially the same shape or is identical on either side of the rotation plane P. The side only differ in that the plurality of second teeth 5 are shifted and/or offset in the circumferential direction C with respect to the plurality of first teeth 4 over half a circular pitch. Alternatively, as shown in a second embodiment of the invention according to FIG. 12, each roller segment 103 may be fully symmetrical or mirrored in the rotation plane P. Moreover, each roller segment 3 of the plurality of roller segments 3 can be identical.

In this example, the guide roller 2 is flexible, i.e. in combination with the aforementioned flexible shaft 6. As such, the guide roller 2 is flexible between the first bend state and second bend state (not shown) different from the first bend state. More in particular, the guide roller 2 is flexible between the first bend state and a straight state in which the roller axis R extends along a straight line, as shown in FIG. 11. Hence, the arc, curvature, diameter and/or radius of the guide roller 2 can be adjusted in a range between the first bend state, the second bend state and/or the straight state. More in particular, in the example as shown in FIGS. 1 and 2, the guide roller 2 is flexible into a maximum bend state in which it can not bend any further. This maximum bend state is for example defined by the shape of the roller segments 3, which abut each other in said maximum bend state. In said maximum bend state, the plurality of roller segments 3 extend over an arc length L along the arc of the roller axis R. The arc length L is measured from the first roller segment 3 to the last roller segment 3 of the plurality of roller segments 3. In this example, the arc length L along the twelve roller segments 3 of the guide roller 2 in the maximum bend state of FIGS. 1 and 2 is just over one-hundred-and-forty degrees. When more roller segments 3 are added, the arc length L can be increased.

Figure 9:
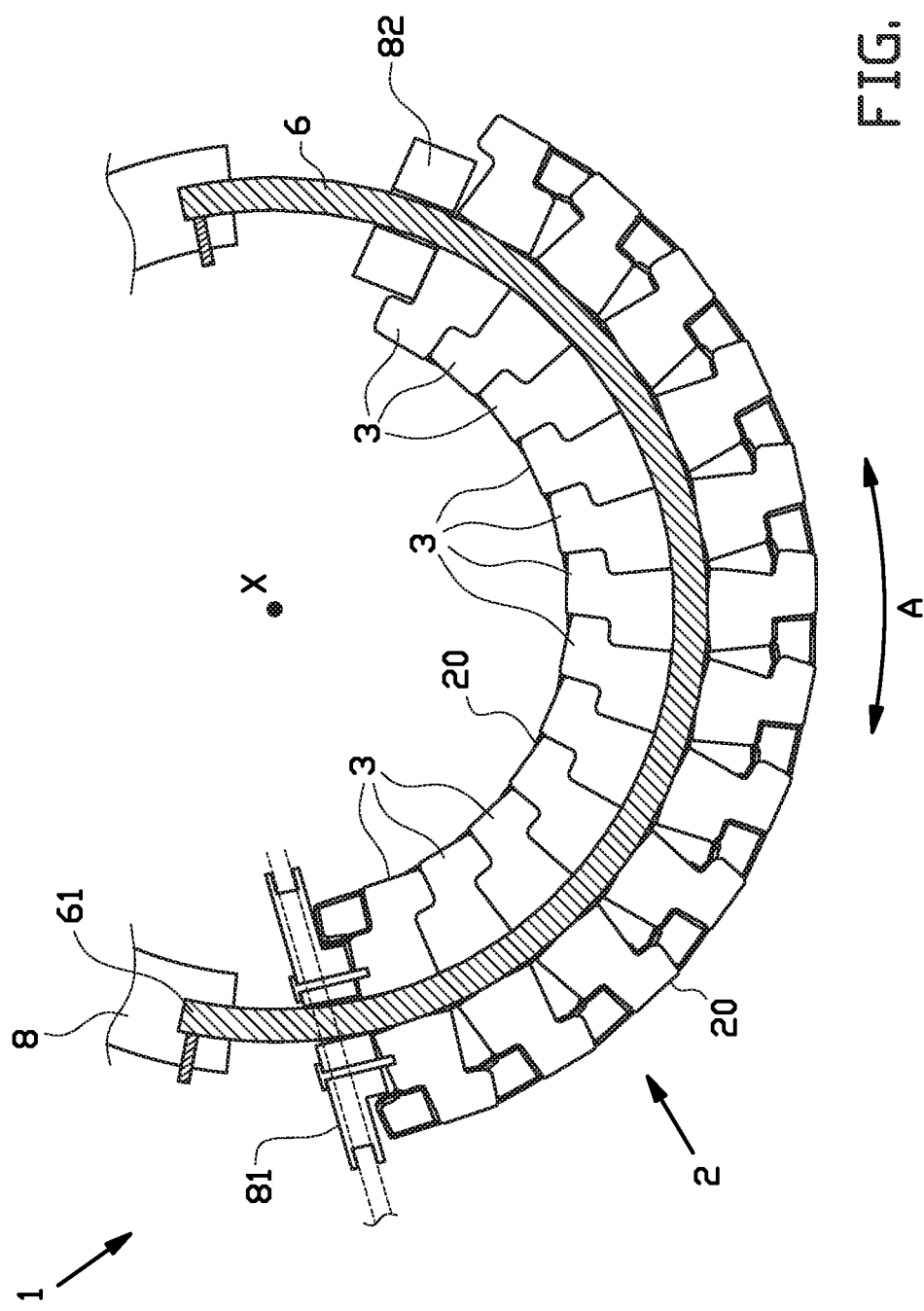
FIG. 9 shows the guiding device, further comprising a support for holding the plurality of roller segments.

As shown in FIG. 9, the guiding device 1 further comprises a support 8 for supporting the guide roller 2 relative to a guide path for the flexible strip. Preferably, the guide roller 2 is freely rotatable relative to the support 8. The shaft 6 has a first end 61 and a second end 62 opposite to the first end 61 in the axial direction A of the roller axis R. In this example, the support 8 is coupled to both the first end 61 and the second end 62 of the shaft 6. When the shaft 6 is rigid and able to hold its shape under the weight of the guide roller 2, then it may be sufficient to hold the shaft 6 at one end 61, 62 only.

Figure 10:
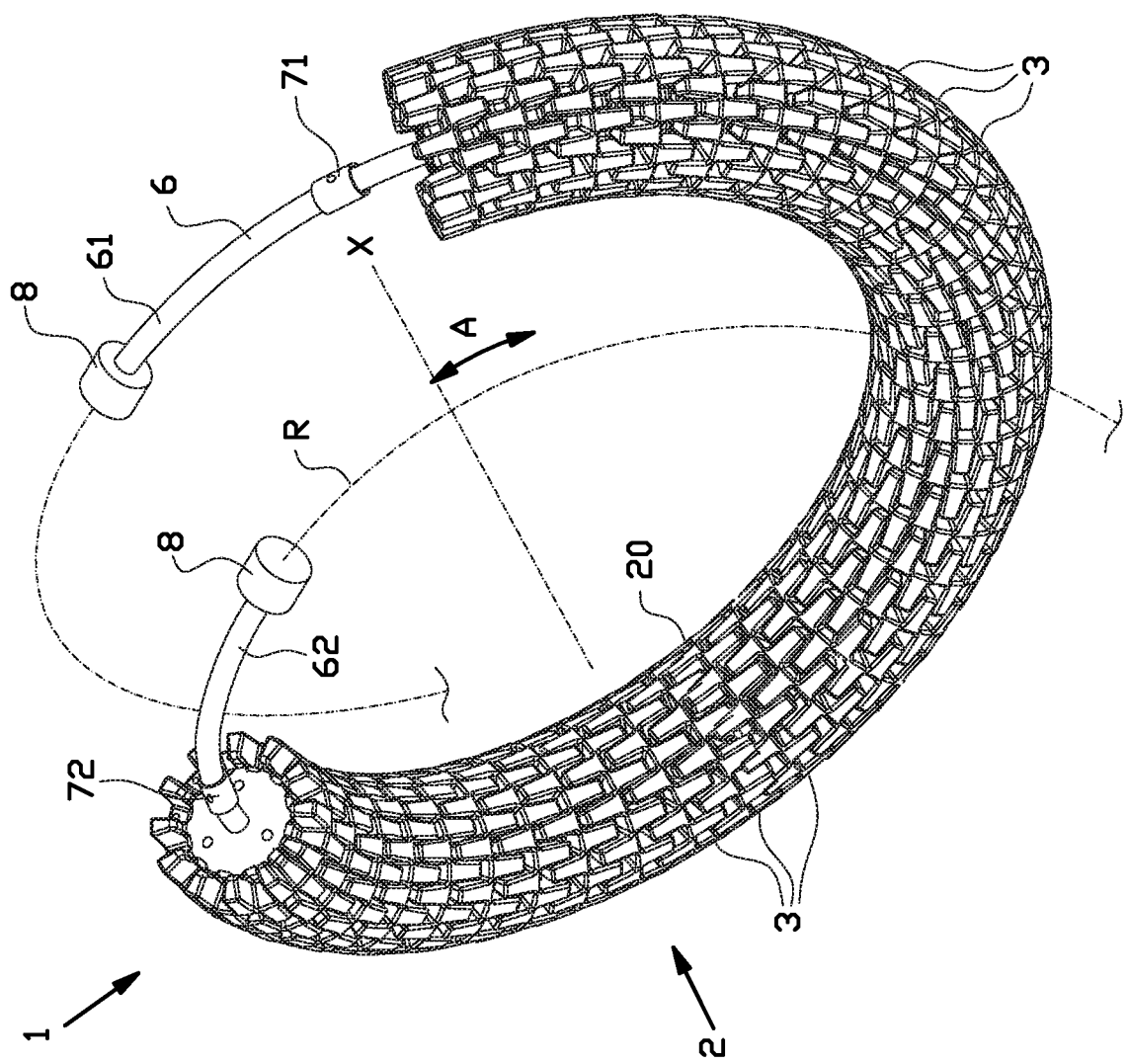
FIG. 10 shows the guiding device of FIG. 1 extended over a winding of an optional helical configuration.

In FIG. 9, the support 8 is arranged for supporting the guide roller 2 such that the roller axis R extends in a single plane. Alternatively, as shown in FIG. 10, the support 8 may be arranged for supporting the guide roller 2 such that the roller axis R extends along a helical path. The support 8 may for example hold the first end 61 of the shaft 6 at a first position and the second end 62 of the shaft 6 at a second position spaced apart from the first position in a pitch direction of the helical path. The guide roller 2 may extend along the helical path over a part of a single winding, over a full winding or over a plurality of windings, i.e. to guide the flexible strip at least one in each winding.

As further shown in FIG. 10, the guiding device 1 may further comprise a first stop member 71 and a second stop member 72 which are fixed in the axial direction A of the roller axis R on the shaft 6 on opposite sides of the guide roller 2. The guide roller 2 is movable in the axial direction A of the roller axis R over the shaft 6 between the first stop member 71 and the second stop member 72. The stop members 71, 72 may prevent that the roller segments 3 move apart too far and/or out of interlock.

As shown in FIGS. 6-9, the guiding device 1 may further comprises one or more additional members to add functionality to the guiding device 1, i.e. to detect forces, loads, strain, motion and/or to drive the guide roller 2. In particular, FIGS. 6, 7 and 8 show different drive wheels 81, 181, 281 as part of a drive for driving the rotation of at least one of the plurality of roller segments 3. The drive wheel 81 as shown in FIG. 6 is a grooved pulley that is typically driven by a flat drive belt, as schematically shown in dashed lines in FIG. 9. FIG. 7 shows a toothed pulley 108 as an alternative to the grooved pulley 81 of FIG. 6. The toothed pulley 181 is typically driven by a toothed belt (not shown). FIG. 8 shows a drive wheel 281 in the form of a sprocket wheel. The sprocket wheel is typically driven by a drive chain (not shown). Alternatively, the drive may comprise a rotary drive that directly engages one of the roller segments 3.

As shown in FIG. 9, the drive wheels 81, 181, 281 may be mounted or coupled directly to one of the roller segments 3, i.e. by fasteners, to rotate together with the respective roller segment 3.

FIG. 9 further shows an optional detection member 82 for detection the rotation of at least one of the plurality of roller segments 3. The detection member 82 may for example be an encoder that is mounted to the shaft 6 close to one of the roller segments 3 to detect a feature of the respective roller segment 3 as it rotates relative to the encoder.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

For example, the guiding device 1 may alternatively be used as a flexible element in a roller conveyor or a belt conveyor. As shown in FIG. 11, the guide roller 2 can be placed in the aforementioned straight state with its rotation axis R extending along a straight line. The guide roller 2 may subsequently be moved into a slightly bend state to generate a steering effect in the conveyor. For this particular application, the guiding device 1 may be provided with an actuator 300 to deflect the guide roller 2 locally in a deflection direction T transverse or perpendicular to the rotation axis R.

In this example, the actuator 300 comprises a deflection roller 301 that can be brought into contact with one or more of the roller segments 3 to push the respective one or more roller segments 3 in the deflection direction T and to cause the guide roller 2 to assume an at least partially bend state. As such, the guide roller 2 can be made to behave like a so-called crowned roller in the conveyor to correct a run-off of a strip or belt running over said conveyor. Preferably, the deflection roller 301 is rotatable about a roller axis parallel to the rotation axis R of the guide roller 2 so that the deflection roller 2 can contact and roll over the rotating roller segments 3 while deflection the guide roller 2.

LIST OF REFERENCE NUMERALS 1 guiding device
2 guide roller
20 exterior guide surface
21 channel
22 channel
23 channel
3 roller segment
30 segment body
31 central aperture
32 surface section
33 bottom land
4 first tooth
40 tooth profile
41 top land
42 root
5 second tooth
50 tooth profile
6 shaft
61 first end
62 second end
71 first stop member
72 second stop member
8 support
81 grooved pulley
82 detection member
9 flexible strip
103 roller segment
181 toothed pulley
281 sprocket wheel
300 actuator
301 deflection roller
A axial direction
B segment axis
C circumferential direction
D destination direction
E inner radius
F outer radius
G interlock direction
H1 oblique angle
H2 oblique angle
H3 cone angle
K pivot axis
M maximum pivot angle
P rotation plane
R roller axis
S1 source direction
S2 source direction
T deflection direction
X center
V valley
W1 outer diameter
W2 arc radius

The invention claimed is:

1. A guiding device for guiding a flexible strip comprising a guide roller that is rotatable about a roller axis and that has an exterior guide surface extending in a circumferential direction about the roller axis for guiding the flexible strip, wherein the guiding device further comprises a support for supporting the guide roller relative to a guide path for the flexible strip, wherein the guide roller comprises a plurality of roller segments juxtaposed in an axial direction along the roller axis for forming the exterior guide surface, wherein the plurality of roller segments are movable relative to each other to enable the guide roller to be positioned in a first bend state in which the roller axis extends along an arc, wherein the plurality of roller segments are interlocked to rotate together about the roller axis in said first bend state, wherein for each pair of two consecutive roller segments, one roller segment of the two consecutive roller segments comprises a plurality of first teeth and the other roller segment of the two consecutive roller segments comprises a plurality of second teeth, wherein the plurality of roller segments extend over an arc length along the arc of the roller axis, wherein the first bend state is a maximum bend state in which said arc length is at least ninety degrees, wherein the roller segments have an outer diameter, wherein the roller axis in the maximum bend state extends along an arc with an arc radius, wherein the ratio between the arc radius and the outer diameter is less than five, wherein the guide roller, in the maximum bend state, has an inner radius and an outer radius with respect to the center of the arc, wherein the plurality of first teeth and the plurality of second teeth are arranged to interlock at both the inner radius and the outer radius when the guide roller is in the maximum bend state.

2. The guiding device according to claim 1, wherein the ratio is in a range between two-and-a-half and five.

3. The guiding device according to claim 1, wherein the guide roller is flexible between the first bend state and a second bend state different from the first bend state, wherein the plurality of roller segments are interlocked to rotate together about the roller axis in a range from the first bend state up to the second bend state.

4. The guiding device according to claim 1, wherein each pair of two consecutive roller segments of the plurality of roller segments is mutually pivotable about a pivot axis perpendicular to the roller axis over a maximum pivot angle of at least three degrees.

5. The guiding device according to claim 1, wherein the plurality of roller segments comprises at least ten roller segments.

6. The guiding device according to claim 1, wherein the guide roller in the first bend state extends along an arc that defines a center, wherein the guide roller has an inner radius with respect to said center, wherein for each pair of two consecutive roller segments of the plurality of roller segments, the two consecutive roller segments are mutually pivotable about a pivot axis perpendicular to the roller aixs, wherein said pivot axis is located between the roller axis and the innter radius.

7. The guiding device according to claim 1, wherein each roller segment comprises a segment body that is rotatable about a segment axis in a rotation plane perpendicular to said segment axis, wherein the plurality of first teeth is distributed in a circumferential direction about the segment axis and projects in an interlock direction from the segment body at a first side of the rotation plane.

8. The guiding device according to claim 7, wherein the interlock direction is parallel to the segment axis.

9. The guiding device according to claim 7, wherein the plurality of second teeth is distributed in a circumferential direction about the segment axis and projecting in the interlock direction from the segment body at a second side of the rotation plane opposite to the first side.

10. The guiding device according to claim 9, wherein each first tooth of the plurality of first teeth has a tooth profile, wherein each second tooth of the plurality of second teeth has the same tooth profile.

11. The guiding device according to claim 9, wherein each second tooth of the plurality of second teeth has a tooth profile, wherein each pair of two consecutive first teeth of the plurality of first teeth define a valley, wherein the valley has a valley profile that is complementary to the tooth profile of the plurality of second teeth.

12. The guiding device according to claim 7, wherein each first tooth of the plurality of first teeth has a crest that defines a top land, wherein said top land extends at an oblique angle to the rotation plane in a range of three to fifteen degrees.

13. The guiding device according to claim 7, wherein each first tooth of the plurality of first teeth has a root, wherein the segment body defines a bottom land between the roots of each pair of two consecutive first teeth of the plurality of first teeth, wherein the bottom land extends at an oblique angle to the rotation plane in a range of three to fifteen degrees.

14. The guiding device according to claim 1, wherein the guiding device further comprises a shaft extending along the roller axis for supporting the plurality of roller segments.

15. The guiding device according to claim 14, wherein each roller segment of the plurality of roller segments is provided with a central aperture for receiving the shaft cocentrically in the respective roller segments.

16. The guiding device according to claim 14, wherein the shaft is resiliently flexible.

17. The guiding device according to claim 14, wherein each roller segment of the plurality of roller segments is movable over the shaft in the axial direction of the roller axis with respect to the other of the plurality of roller segments.

18. The guiding device according to claim 14, wherein the guiding device further comprises a first stop member and a second stop member which are fixed in the axial direction of the roller axis on the shaft on opposite sides of the guide roller, wherein the guide roller is movable in the axial direction of the roller axis over the shaft between the first stop member and the second stop member.

19. The guiding device according to claim 1, wherein the support is arranged for supporting the guide roller such that the roller axis extends along a helical path.

20. The guiding device according to claim 1, wherein the guide roller is provided with one or more channels extending through each of the plurality of roller segments along a respective biasing path to receive a respective biasing member.

21. The guiding device according to claim 20, wherein the one or more channels comprises at least three channels spaced apart from and evenly distributed about the roller axis.

22. The guiding device according to claim 1, wherein each roller segment has a side resembling a bevel gear wheel.

23. The guiding device according to claim 1, wherein each roller segment has a side resembling a crown gear wheel.

* * * * *